United States Patent [19]

Takahashi et al.

[11] Patent Number: 4,749,266

[45] Date of Patent: Jun. 7, 1988

[54] COMPACT ZOOM LENS HAVING A LARGE APERTURE AND GOOD ABERATION CORRECTION OVER AN EXTENDED ZOOMING RANGE

[75] Inventors: Sadatoshi Takahashi, Tokyo; Sadahiko Tsuji, Kanagawa, both of Japan

[73] Assignee: Canon Kabushiki Kaisha

[21] Appl. No.: 552,486

[22] Filed: Nov. 16, 1983

[30] Foreign Application Priority Data

Nov. 19, 1982 [JP] Japan .................................. 57-203959

[51] Int. Cl.$^4$ .............................................. G02B 15/14
[52] U.S. Cl. ..................................... 350/427; 350/423
[58] Field of Search ........................ 350/423, 427, 428

[56] References Cited

U.S. PATENT DOCUMENTS 3,512,872  5/1970  Lynch et al. ........................ 350/427
4,437,732  3/1984  Ishiyama ............................. 350/427
4,501,475  2/1985  Fujita et al. ......................... 350/427

Primary Examiner—John K. Corbin
Assistant Examiner—Scott J. Sugarman
Attorney, Agent, or Firm—Toren, McGeady & Associates

[57] ABSTRACT

A zoom lens including, from front to rear, a first lens group of positive power, a second lens group of negative power, a third lens group of positive power, a fourth lens group of negative power, and a fifth lens group of positive power. For zooming from the shortest focal length to the longest focal length, the first lens group is moved forward, the air space between the first and second lens groups is increased, the air space between the second and the third lens groups is decreased, the air space between the third and fourth lens groups is increased, and the air space between the fourth and fifth lens groups is decreased. The fifth lens group remains stationary during zooming. This construction and arrangement results in a zoom lens of compact form with a large aperture while still permitting good stability of aberration correction throughout a greatly extended zooming range.

10 Claims, 6 Drawing Sheets

COMPACT ZOOM LENS HAVING A LARGE APERTURE AND GOOD ABERATION CORRECTION OVER AN EXTENDED ZOOMING RANGE

BACKGROUND OF THE INVENTION

1. Field of the Invention

This invention relates to five-component zoom lenses suited for still cameras, cine cameras and video cameras, and more particularly to such zoom lenses which have a high relative aperture and a greatly increased zoom ratio in a compact form while enabling good stability of aberration correction throughout the extended zooming range.

2. Description of the Prior Art

Prior art five-component zoom lenses with a power distribution of positive, negative, positive, negative and positive lens groups, from front to back are described in Japanese Patent Publication No. SHO 39-6127 (hereinafter called prior art example 1), F.P. No. 1336300 (prior art example 2), and British Pat. No. 2,078,997 (prior art example 3). In prior art example 1, as illustrated in FIG. 1 beginning with the first lens group 1, positive, negative, positive, negative and positive refractive powers are distributed in this order. The second lens group 2, third lens group 3 and fourth lens group 4 are axially movable for zooming, contribute respective ranges of magnification powers each across $-1$ times. Since the first lens group is held stationary during zooming, for the range of magnification powers of the second lens group to be increased, the total movement of the second lens group must be largely increased. Since the movement of the third lens group is directed forward to increase its magnification power, and that of the fourth lens group is rearwardly directed to increase its magnification power, the space the third and fourth lens groups occupy to perform the zooming operation must be created long enough. Therefore, the physical length of the lens system tends to increase in the longitudinal direction. The prior art example 2 represents a zoom lens of the optical compensation type with positive, negative, positive, negative and positive refractive powers in this order from the front. During zooming from the shortest focal length to the longest focal length, the second and fourth lens groups move rearward as a unit, while the third lens group moves forward. Since the first lens group is fixed against zooming, for the second lens group to contribute to an increase of the zoom ratio, it must be moved a far larger distance. As the second lens group is united with the fourth lens group, the physical length of the entire system tends to increse. The prior art example 3, though having the same power distribution as the above, furnishes another type of zoom lens of which all the five lens groups are made axially movable. Since the movement of the fifth lens group is made to be directed forward while zooming to the longest focal length, a sufficient movement cannot be imparted into the fourth lens group. Therefore, despite the fourth lens group being made to move during zooming, its contribution to a varifocal power of the entire system is lowered. Further, since a much-desired increase in the zoom ratio can be achieved solely by elongating the total movements of the positive or third and fifth lens groups, a zoom lens of very long total length will result. Though such increase in the total movement of the positive lens groups heightens the varifocal effect, it has a drawback of increasing variation of aberrations. Also when the shortening of the total length of the lens system is otherwise achieved by strengthening the positive refractive powers of the third and fifth lens groups, it has a tendency to make the variation of aberrations during zooming become very prominent.

SUMMARY OF THE INVENTION

It is an object of the present invention to provide a five-component zoom lens having a greatly increased zoom ratio while limiting the bulk and size thereof to a minimum.

Another object is to provide a zoom lens which enables a great increase in the zoom ratio to be achieved while preserving a high relative aperture and high grade stability of aberration correction throughout the extended range.

To accomplish these objects of the invention, its feature is the construction of a zoom lens system by five lens groups in such form that the first lens group counting from the front is positive, the second negative, the third positive, the fourth negative and the fifth positive, with their arrangement being such that when zooming, the first and fourth lens groups move axially along with axial movement of at least one of the second and third lens groups, and zooming from the shortest focal length to the longest focal length, the first lens group moves forward with an increasing air space between the first and second lens groups, a second air space between the second and third lens groups decreases, a third air space between the third and fourth lens groups increases, and a fourth air space between the fourth and fifth lens groups decreases. The fifth lens group remains stationary during zooming.

DESCRIPTION OF THE PREFERRED EMBODIMENTS

Figure 1:
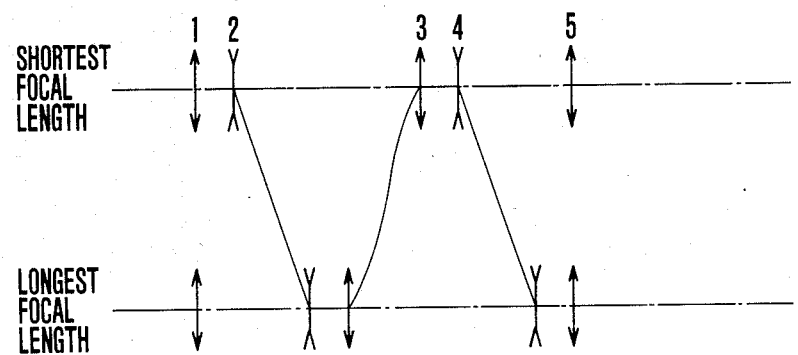
FIG. 1 is a schematic diagram of an optical power distribution over the entire system and the zooming paths of the lens groups of a prior art zoom lens.
Figure 2:
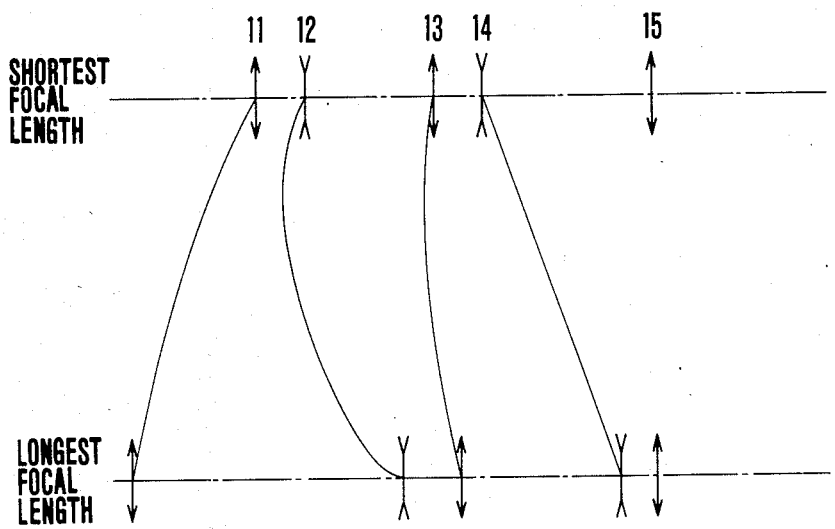
FIG. 2 is a schematic diagram of a specific embodiment of a zoom lens according to the present invention in respect to an optical power distribution thereof along with the paths of movement of the zoom lens groups during zooming.

A first embodiment of the invention is schematically shown in FIG. 2 for the paraxial power distributions in the shortest focal length and the longest focal length along with curves illustrating the paths of movement of the zoom lens groups thereof. Numerical data for a specific example of this embodiment are given in Table 1 wherein fi is the focal length of the i-th lens group, l'i is the interval between the principal points of the i-th and (i+1) lens groups, and $\beta i$ is the image magnification of the i-th lens group. When the first lens group 11 is made to have a positive refractive power, the diameters of the second lens groups and those that follow can be minimized, thereby offering the additional advantage that the aberrational problem becomes easy to solve because the height of incidence of rays on the second to the fifth lens groups is lowered. By increasing the axial air space between the first lens group 11 and the second lens group 12 when at the longest focal length, as compared with at the shortest focal length, the second lens group can be made to have a varifocal function. Hereinafter let us refer to the first and second lens groups as the "first varifocal section I". To bring the first lens group 11 to a more forward point when at the longest focal length than when at the shortest focal length implies that under the condition that the second lens group retains an equivalent varifocal effect, the required total movement of the second lens group is shorter than when the first lens group is fixed. As the space the second lens group occupies in operation can be reduced in the axial direction, therefore, the physical length of the entire system in the shortest focal length can be shortened. (The third and fourth lens groups are hereinafter called a "second varifocal section II"). The third lens group 13 converges the arriving rays of divergence with the advantage that the height of incidence of the rays on the fourth lens group 14 is lowered to thereby shorten the diameter of the fourth lens group. To bring the negative or fourth lens group 14 to a more rearward point when at the longest focal length than when at the shortest focal length is to allow a varifocal effect to be had. The fifth lens group 15 is an image forming lens group by which the focal length of the entire system at a certain zooming position can be adjusted to a desired value, and which is held stationary during zooming. Or otherwise, if for the fifth lens group is also given a variable power, it is made to move forward as zooming from the shortest focal length to the longest focal length, while simultaneously moving the fourth lens group 14 rearward, the air space between the fourth and fifth lens groups at the shortest focal length must be increased by a distance almost equal to the total movement of the fifth lens group 15, thereby the physical length of the entire lens system is disadvantageously increased. Another problem arising from the use of such movable lens group for zooming as the fifth one is that the lens diameter must be increased to admit a light bundle assuring the prescribed value of F-number. Moreover, since more than enough rays of light of intermediate image angles in the shortest focal length enter, it is also disadvantageous from the standpoint of aberration correction. For this reason, it is advantageous to hold the fifth lens group 15 stationary and to arrange for the fourth lens group, when zooming from the shortest focal length to the longest focal length, to move rearward to produce a varifocal effect. In a numerical example of this embodiment, of the zoom ratio, the second lens group accounts for 2.98 times, the third lens group for 0.98 times, and the fourth lens group for 3.37 times, the second varifocal section II accounting for 3.31. The use of the refractive powers alternating the positive and negative signs over all the lens groups provides the possibility of compensating for the residual aberrations of one lens group by the positive-versus-negative relationship of the adjacent lens groups. Also since the second lens group in the first varifocal section I and the fourth lens group in the second varifocal section II, or the two negative lens groups, partake in the varifocal action of the entire system with each other, good correction of aberrations can be stabilized throughout the zooming range. Such partition of the varifocal action also makes it possible to reduce the degree of sensitivity of each movable lens group.

NUMERICAL EXAMPLE 1

| Focal Length | 1.0 | 9.87 |
|---|---|---|
| f1 | 8.300 | |
| f2 | −1.800 | |
| f3 | 2.378 | |
| f4 | −1.572 | |
| f5 | 2.100 | |
| l1 | 1.100 | 4.688 |
| l2 | 2.077 | 0.924 |
| l3 | 0.800 | 2.653 |
| l4 | 3.447 | 1.277 |
| $\beta_2$ | −0.333 | −0.993 |
| $\beta_3$ | −1.133 | −1.114 |
| $\beta_4$ | −0.582 | −1.963 |
| $\beta_5$ | −0.547 | −0.547 |

From the thin lens system of the numerical data in Table 1 is then derived a specific thick lens system which may be constructed in accordance with the numerical data given in Table 2 for the radii of curvature, R, of the lens surfaces, the axial thicknesses and air spaces, D, and the refractive indices, N, and the Abbe numbers, $\nu$, of the glasses of the lens elements with the subscripts consecutively numbered from front to rear.

Figure 3:
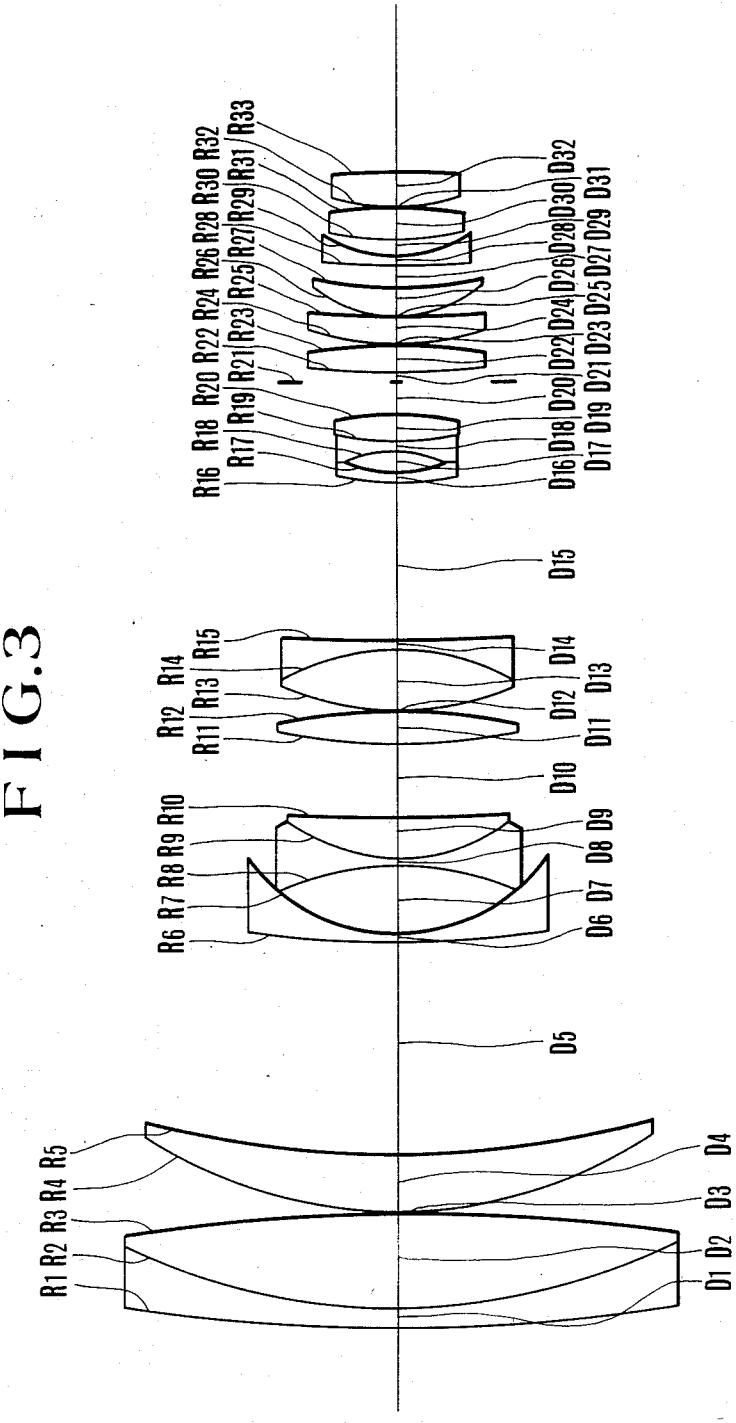
FIG. 3 is a longitudinal section view of a numerical specific example 2 of the zoom lens of the invention.
Figure 4A:
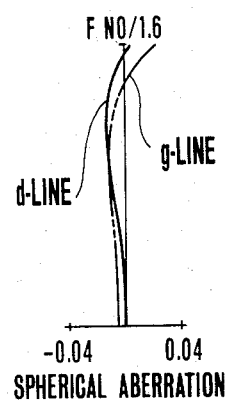
FIGS. 4(a), 4(b) and 4(c) are graphic representations of all the aberrations of the zoom lens of FIG. 3 in the shortest, intermediate and longest focal lengths respectively wherein M denotes the meridional image surface, and S the sagittal image surface.
Figure 4A:
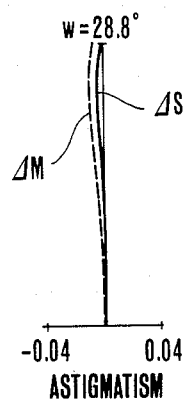
Figure 4A:
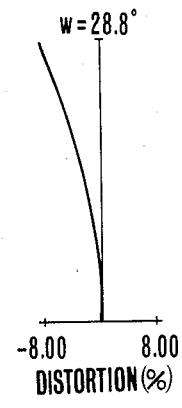
Figure 4B:
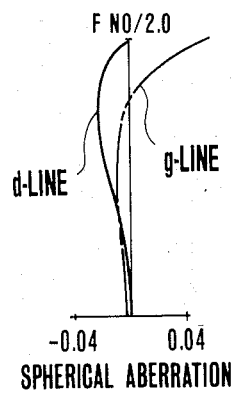
Figure 4B:
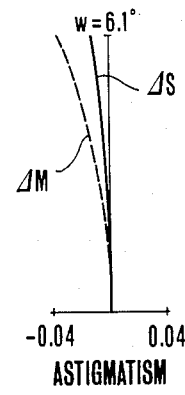
Figure 4B:
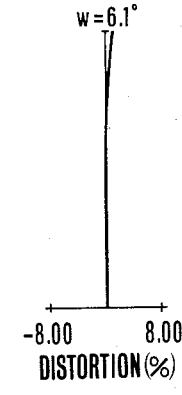
Figure 4C:
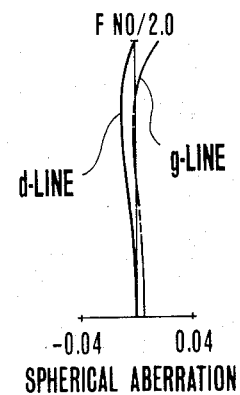
Figure 4C:
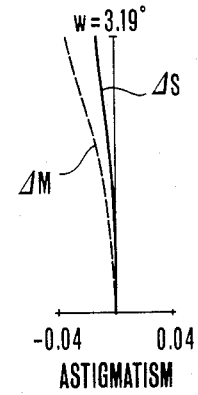
Figure 4C:
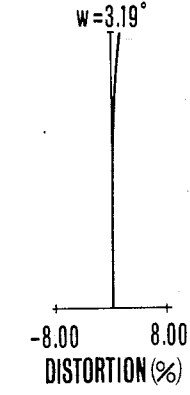

FIG. 3, illustrates a lens block diagram of numerical specific example 2 in an intermediate focal length position. All the aberrations of this zoom lens in the shortest, intermediate and longest focal lengths are shown in FIGS. 4(a) to 4(c), respectively.

NUMERICAL EXAMPLE 2

TABLE 2

$F = 1.00 - 9.87 \quad FNO = 1:1.6 - 2.0 \quad 2\omega = 56.6° - 6.38°$

| | | | |
|---|---|---|---|
| R1 = 21.10 | D1 = 0.20 | N1 = 1.80518 | $\nu_1$ = 25.4 |
| R2 = 6.81 | D2 = 1.10 | N2 = 1.60311 | $\nu_2$ = 60.7 |
| R3 = −19.23 | D3 = 0.01 | | |
| R4 = 5.00 | D4 = 0.65 | N3 = 1.69680 | $\nu_3$ = 55.5 |
| R5 = 11.28 | D5 = Variable | | |
| R6 = 12.04 | D6 = 0.10 | N4 = 1.77250 | $\nu_4$ = 49.6 |
| R7 = 2.10 | D7 = 0.77 | | |
| R8 = −3.35 | D8 = 0.10 | N5 = 1.77250 | $\nu_5$ = 49.6 |
| R9 = 2.20 | D9 = 0.45 | N6 = 1.84666 | $\nu_6$ = 23.9 |
| R10 = 92.81 | D10 = Variable | | |
| R11 = 7.16 | D11 = 0.40 | N7 = 1.77250 | $\nu_7$ = 49.6 |
| R12 = −5.79 | D12 = 0.01 | | |
| R13 = 3.27 | D13 = 0.70 | N8 = 1.77250 | $\nu_8$ = 49.6 |
| R14 = −2.51 | D14 = 0.10 | N9 = 1.84666 | $\nu_9$ = 23.9 |
| R15 = 27.37 | D15 = Variable | | |
| R16 = 4.33 | D16 = 0.10 | N10 = 1.83400 | $\nu_{10}$ = 37.2 |
| R17 = 1.50 | D17 = 0.28 | | |
| R18 = −1.43 | D18 = 0.10 | N11 = 1.77250 | $\nu_{11}$ = 49.6 |
| R19 = 4.66 | D19 = 0.30 | N12 = 1.84666 | $\nu_{12}$ = 23.9 |
| R20 = −3.81 | D20 = Variable | | |
| R21 = Stop | D21 = 0.10 | | |
| R22 = 12.33 | D22 = 0.30 | N13 = 1.69680 | $\nu_{13}$ = 55.5 |
| R23 = −7.33 | D23 = 0.01 | | |
| R24 = 3.49 | D24 = 0.30 | N14 = 1.69680 | $\nu_{14}$ = 55.5 |
| R25 = 12.40 | D25 = 0.01 | | |
| R26 = 1.58 | D26 = 0.30 | N15 = 1.69680 | $\nu_{15}$ = 55.5 |
| R27 = 4.12 | D27 = 0.25 | | |
| R28 = 13.88 | D28 = 0.10 | N16 = 1.80518 | $\nu_{16}$ = 25.4 |
| R29 = 1.36 | D29 = 0.20 | | |
| R30 = 2.95 | D30 = 0.40 | N17 = 1.51633 | $\nu_{17}$ = 64.1 |
| R31 = −8.04 | D31 = 0.01 | | |
| R32 = 2.81 | D32 = 0.40 | N18 = 1.51633 | $\nu_{18}$ = 64.1 |
| R33 = −9.59 | | | |

| Focal Length | 1.00 | 5.18 | 9.87 |
|---|---|---|---|
| D5 | 0.095 | 2.436 | 3.683 |
| D10 | 1.248 | 0.844 | 0.095 |
| D15 | 0.122 | 1.830 | 1.975 |

TABLE 2-continued

|  | | | |
|---|---|---|---|
| D20 | 2.269 | 0.401 | 0.100 |

Figure 5A:
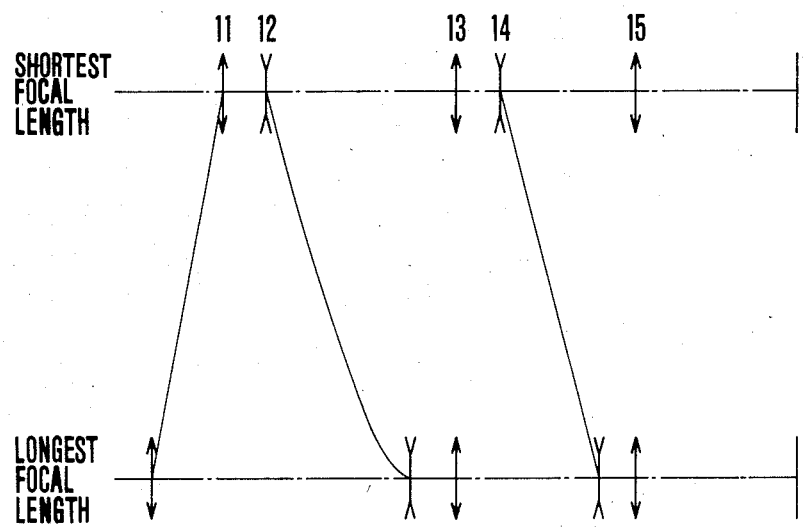
FIGS. 5 to 9 are similar diagrams to FIG. 2 except tha numerical specific examples 3 to 7 of the zoom lens of the invention are illustrated, respectively.

A second embodiment of the present invention is schematically shown in FIG. 5(a). Numerical data for this zoom lens are given in Table 3 as a numerical example 3. The zoom lens has lens groups of positive, negative, positive, negative and positive refractive powers in this order from the front. While zooming from the shortest focal length, the first lens group 11 moves forward while simultaneously the second lens group 12 moves rearward, so that the air space therebetween is widened. Though the third lens group 13 is made stationary, the air space betwen the second and third lens groups is narrowed. The fourth lens group 14 moves rearward so that the air space between the third lens group 13 and the fourth lens group 14 is widened, and the next air space between the fourth lens group 14 and the fifth lens group 15 is shortened. The fifth lens group 15 is an image forming one.

In this numerical example 3, of the zoom ratio, the second lens group accounts for 3.2 times, the third lens group for 1.70 times, the fourth lens group for 1.82, and the second varifocal section II for 3.13.

Figure 5B:
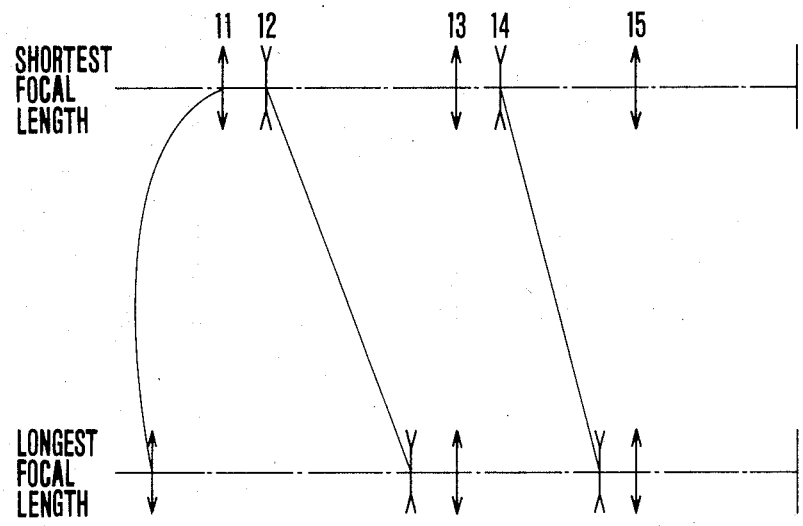

While the zoom lens of FIG. 5(a) has the image shift compensating provision in the non-linear movement of the second lens group 12, the second lens group 12 may be otherwise moved linearly, and the image shift compensating provision is put on the first lens group 11, to form a zoom lens of FIG. 5(b).

In the zoom lens of FIG. 5(b), the first lens group 11 takes its frontmost place when at an intermediate focal length, and as further zooming toward the longest focal length, slightly returns to the rear, reaching a more forward point than when at the shortest focal length. Hence, an equivalent varifocal result is effected by a reduced total movement of the second lens group 12.

NUMERICAL EXAMPLE 3

TABLE 3

| Focal Length | 1.000 | 10.006 |
|---|---|---|
| f1 | 8.000 | |
| f2 | −1.690 | |
| f3 | 2.290 | |
| f4 | −1.700 | |
| f5 | 2.003 | |
| l1 | 0.800 | 4.605 |
| l2 | 3.400 | 0.875 |
| l3 | 0.800 | 2.527 |
| l4 | 2.400 | 0.673 |
| β2 | −0.307 | −0.991 |
| β3 | −0.690 | −1.175 |
| β4 | −1.240 | −2.256 |
| β5 | −0.476 | −0.476 |

Figure 6:
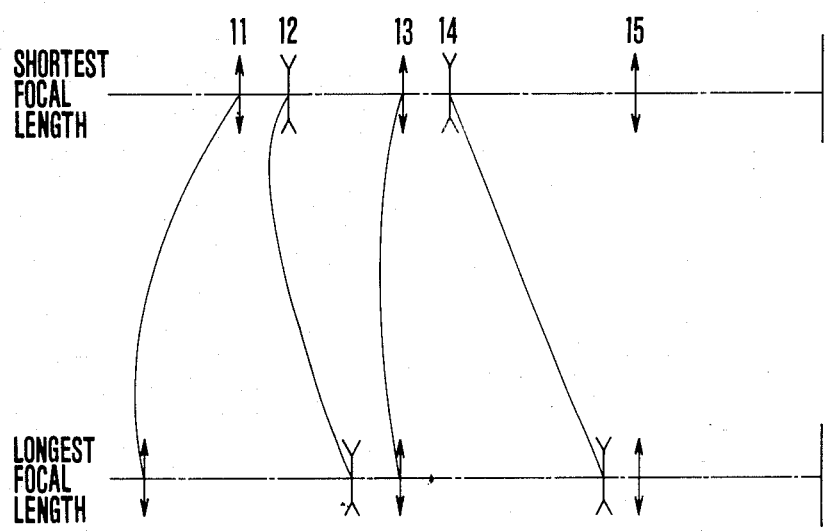

A third embodiment of the invention is shown in FIG. 6. Numerical data for this zoom lens are given in Table 4 as a numerical example 4. When zooming from the shortest focal length to the longest focal length, the first lens group 11 moves forward so that the air space between the first lens group 11 and the second lens group 12 is increased. The air space between the second lens group 12 and the third lens group 13 is decreased, the air space between the third lens group 13 and the fourth lens group 14 is increased, and the air space between the fourth lens group 14 and the fifth lens group 15 is decreased. The fifth lens group 15 is stationary against zooming.

In this numerical example, the second lens group 12 in the first varifocal section I performs 2.08 times variation of the image magnification, the third lens group 13 performs 1.28 times variation of the image magnification, and the fourth lens group 14 performs 3.8 times variation of the image magnification. In the second varifocal section as a whole, 4.85 times variation is effected.

NUMERICAL EXAMPLE 4

TABLE 4

| Focal Length | 1.000 | 10.076 |
|---|---|---|
| f1 | 8.000 | |
| f2 | −1.835 | |
| f3 | 2.300 | |
| f4 | −1.512 | |
| f5 | 1.981 | |
| l1 | 0.800 | 3.583 |
| l2 | 1.929 | 0.800 |
| l3 | 0.800 | 3.355 |
| l4 | 3.140 | 0.600 |
| β2 | −0.342 | −0.711 |
| β3 | −1.100 | −1.404 |
| β4 | −0.600 | −2.280 |
| β5 | −0.554 | −0.554 |

Figure 7:
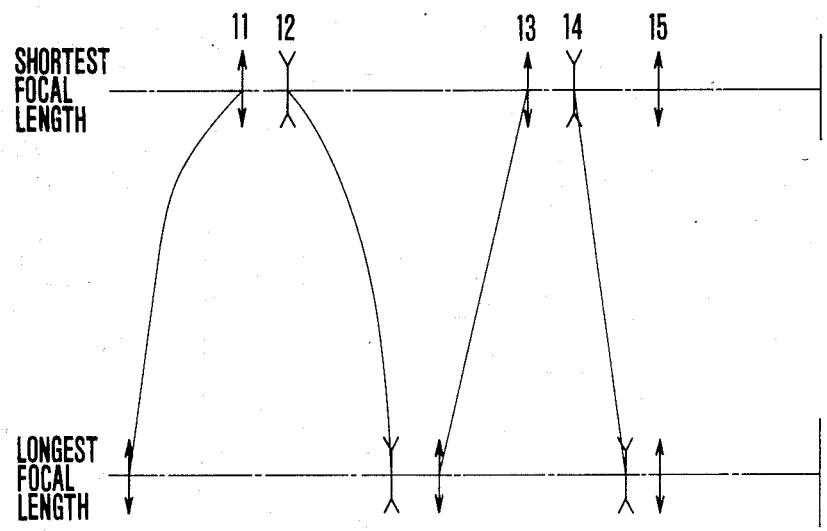

A fourth embodiment of the invention is shown in FIG. 7. Numerical data for this zoom lens are given in Table 5. As one zooms from the shortest focal length to the longest focal length, the first lens group 11 moves forward, the air space between the first and second lens groups 11 and 12 increases, the air space between the second and third lens groups 12 and 13 decreases, the air space between the third and fourth lens groups 13 and 14 increases, and the air space between the fourth lens group 14 and the fixed fifth lens group 15 decreases.

In this numerical example, the second lens group in the first varifocal section accounts for 3.0 times variation of the focal length of the entire system, the third lens group for 2.563 times, the fourth lens group for 1.3 times, and the second varifocal section for 3.33 times.

NUMERICAL EXAMPLE 5

TABLE 5

| Focal Length | 1.000 | 10.000 |
|---|---|---|
| f1 | 8.000 | |
| f2 | −1.627 | |
| f3 | 2.335 | |
| f4 | −1.807 | |
| f5 | 1.901 | |
| l1 | 0.800 | 4.515 |
| l2 | 4.124 | 0.800 |
| l3 | 0.800 | 3.252 |
| l4 | 1.467 | 0.600 |
| β2 | −0.292 | −0.876 |
| β3 | −0.600 | −1.538 |
| β4 | −1.600 | −2.080 |
| β5 | −0.446 | −0.446 |

Figure 8:
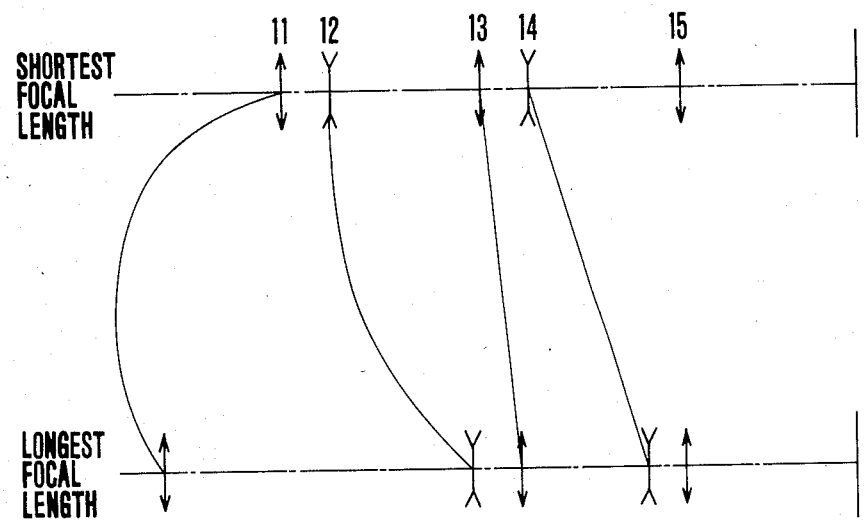

A fifth embodiment of the invention is shown in FIG. 8. Numerical data for this zoom lens are given in Table 6 as a numerical example 6. When zooming from the shortest focal length to the longest focal length, the first lens group 11 moves forward, the air space between the first and second lens groups 11 and 12 increases, the air space between the second and third lens groups 12 and 13 decreases, the air space between the third and fourth lens groups 13 and 14 increases and the air space between the fourth and fifth lens groups 14 and 15 decreases. In this numerical example, the second lens group 12 in the first varifocal section accounts for 4.5 times variation of the focal length of the entire system, the third lens group for 0.79 times, the fourth lens group for 2.80 times and the second varifocal section II for 2.2 times.

NUMERICAL EXAMPLE 6

TABLE 6

| Focal Length | 1.000 | 9.996 |
|---|---|---|
| f1 | 8.000 | |
| f2 | −1.835 | |
| f3 | 2.544 | |
| f4 | −1.704 | |
| f5 | 1.841 | |
| l1 | 0.800 | 4.973 |
| l2 | 2.395 | 0.800 |
| l3 | 0.800 | 2.047 |
| l4 | 2.440 | 0.601 |
| β2 | −0.342 | −1.540 |
| β3 | −1.100 | −0.873 |
| β4 | −0.600 | −1.679 |
| β5 | −0.554 | −0.554 |

Figure 9:
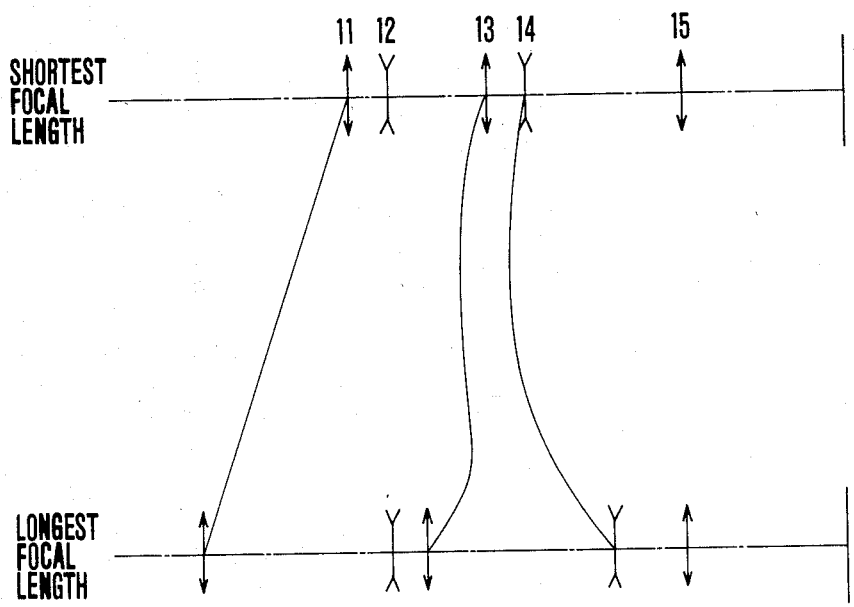

A sixth embodiment of the invention is shown with a numerical example of paraxial power distributions and image magnifications in Table 7, and with a diagram of the paraxial power distributions and the paths of movement of the zoom lens groups in FIG. 9. The second lens group 12 and the fifth lens group 15 are stationary during zooming. As compared with the shortest focal length, when at the longest focal length, the first lens group 11 takes its place on the object side, the air space between the first lens group 11 and the second lens group 12 is increased, the air space between the second lens group 12 and the third lens group 13 is decreased, the air space between the third lens group 13 and the fourth lens group 14 is increased, and the air space between the fourth lens group 14 and the fifth lens group 15 is decreased. In this numerical example, the first varifocal section of the second lens group accounts for 2.16 times variation of the focal length of the entire system, the third lens group for 1.38 times, the fourth lens group for 2.79 times, and the second varifocal section for 2.85 times.

NUMERICAL EXAMPLE 7

TABLE 7

| Focal Length | 1.000 | 8.322 |
|---|---|---|
| f1 | 8.000 | |
| f2 | −1.730 | |
| f3 | 2.300 | |
| f4 | −1.512 | |
| f5 | 2.063 | |
| l1 | 0.800 | 3.740 |
| l2 | 2.000 | 0.823 |
| l3 | 0.800 | 3.518 |
| l4 | 3.140 | 1.598 |
| β2 | −0.316 | −0.683 |
| β3 | −1.163 | −1.601 |
| β4 | −0.568 | −1.587 |
| β5 | −0.599 | −0.599 |

As has been described in greater detail above, according to the present invention, a compact zoom lens well corrected for all aberrations can be achieved.

What we claim:

1. A zoom lens comprising:
   from front to rear, a first lens group of positive power movable for zooming, a second lens group of negative power, a third lens group of positive power, and a fourth lens group of negative power movable for zooming and a fifth lens group of positive power stationary during zooming; and
   means arranged upon zooming to move said first, said fourth, and at least one of said second and said third lens groups in such a way that, as compared with a shortest focal length, when in a longest focal length, said first lens group takes its place in a forward position, an axial air space between said first and said second lens groups is increased, and axial air space between said second and said third lens groups is decreased, an axial air space between said third and said fourth lens groups is increased, and an axial air space between said fourth and said fifth lens groups is decreased, wherein said second and said fourth lens groups have larger absolute values of magnification when at the longest focal length than when at the shortest focal length.

2. A zoom lens according to claim 1, wherein said fourth lens group takes its place in a rearward position when at the longest focal length as compared with at the shortest focal length.

3. A zoom lens according to claim 1, wherein said second lens group is held stationary during zooming.

4. A zoom lens according to claim 1, wherein said third lens group is held stationary during zooming.

5. A zoom lens according to claim 1, wherein said second and said third lens groups move during zooming.

6. A zoom lens according to claim 4 or claim 5, wherein said second lens group takes its place in a rearward position when at the longest focal length as compared with at the shortest focal length.

7. A zoom lens comprising:
   from front to rear, a first lens group of positive power movable for zooming, a second lens group of negative power, a third lens group of positive power, and a fourth lens group of negative power movable for zooming and a fifth lens group of positive power stationary during zooming; and
   means arranged upon zooming to move said first, said fourth, and at least one of said second and said third lens groups in such a way that, as compared with a shortest focal length, when in a longest focal length, said first lens group takes its place in a forward position, said fourth lens group takes its place in a rearward position, an axial air space between said first and said second lens groups is increased, and axial air space between said second and said third lens groups is decreased, an axial air space between said third and said fourth lens groups is increased, and an axial air space between said fourth and said fifth lens groups is decreased, wherein said second lens group is held stationary during zooming.

8. A zoom lens comprising:
   from front to rear, a first lens group of positive power movable for zooming, a second lens group of negative power, a third lens group of positive power, and a fourth lens group of negative power movable for zooming and a fifth lens group of positive power stationary during zooming; and
   means arranged upon zooming to move said first, said fourth, and at least one of said second and said third lens groups in such a way that, as compared with a shortest focal length, when in a longest focal length, said first lens group takes its place in a forward position, said fourth lens group takes its place in a rearward position, an axial air space between said first and said second lens groups is increased, and axial air space between said second and said third lens groups is decreased, an axial air space between said third and said fourth lens groups is increased, and an axial air space between said fourth and said fifth lens groups is decreased, wherein said third lens group is held stationary during zooming.

9. A zoom lens comprising:

from front to rear, a first lens group of positive power movable for zooming, a second lens group of negative power, a third lens group of positive power, and a fourth lens group of negative power movable for zooming and a fifth lens group of positive power stationary during zooming; and means arranged upon zooming to move said first, said fourth, and at least one of said second and said third lens groups in such a way that, as compared with a shortest focal length, when in a longest focal length, said first lens group takes its place in a forward position, said fourth lens group takes its place in a rearward position, an axial air space between said first and said second lens groups is increased, and axial air space between said second and said third lens groups is decreased, an axial air space between said third and said fourth lens groups is increased, and an axial air space between said fourth and said fifth lens groups is decreased, wherein said second and third lens group move during zooming.

10. A zoom lens according to claim 8 or 9, wherein said second lens group takes its place in a rearward position when at the longest focal length as compared with at the shortest focal length.

* * * * *